United States Patent [19]

Marfilius et al.

[11] Patent Number: 5,743,982
[45] Date of Patent: Apr. 28, 1998

[54] METHOD FOR BONDING A COVER TO A FLEXIBLE PAD

[75] Inventors: Donald F. Marfilius, Farmington Hills; William F. Klems, Troy, both of Mich.; Iftikhar Kamil, Springboro, Ohio

[73] Assignee: Magna Lomason Corporation, Farmington Hills, Mich.

[21] Appl. No.: 674,176

[22] Filed: Jul. 1, 1996

[51] Int. Cl.$^6$ .......................... B29C 65/02; B29C 65/18
[52] U.S. Cl. .......................... 156/212; 156/28; 156/583.3
[58] Field of Search .......................... 156/212, 583.3, 156/214, 285; 297/DIG. 1, DIG. 2; 425/DIG. 19

[56] References Cited

U.S. PATENT DOCUMENTS

| | | | |
|---|---|---|---|
| 4,447,282 | 5/1984 | Valerio et al. | 158/583.3 |
| 4,559,094 | 12/1985 | Hostetler et al. | 156/212 |
| 4,692,199 | 9/1987 | Kozlowski et al. | |
| 5,176,777 | 1/1993 | Guilhem . | |
| 5,232,543 | 8/1993 | Frelich et al. | 156/583.3 |
| 5,407,510 | 4/1995 | Marfilius et al. . | |

FOREIGN PATENT DOCUMENTS

| | | | |
|---|---|---|---|
| 57-46848 | 3/1982 | Japan | 156/212 |
| 59-18209 | 4/1984 | Japan | 156/212 |

*Primary Examiner*—Richard Crispino
*Attorney, Agent, or Firm*—Cushman Darby & Cushman IP Group of Pillsbury Madison & Sutro LLP

[57] ABSTRACT

A method and apparatus is disclosed whereby an assist fixture is provided to clamp about a seat assembly, whereupon both are immersed in a bed apparatus and into a pressed relation against a cushion of hot air. The seat assembly includes a preformed flexible pad having an appearance surface and a cover adapted to be adhesively bonded to the pad during the immersion. The assist fixture includes tubular members which press the cover into preformed indentations in the appearance face of the pad to assist in enhancing surface definition, the tubular members can be adapted to pass hot or cold air depending on the stage of the process.

8 Claims, 7 Drawing Sheets

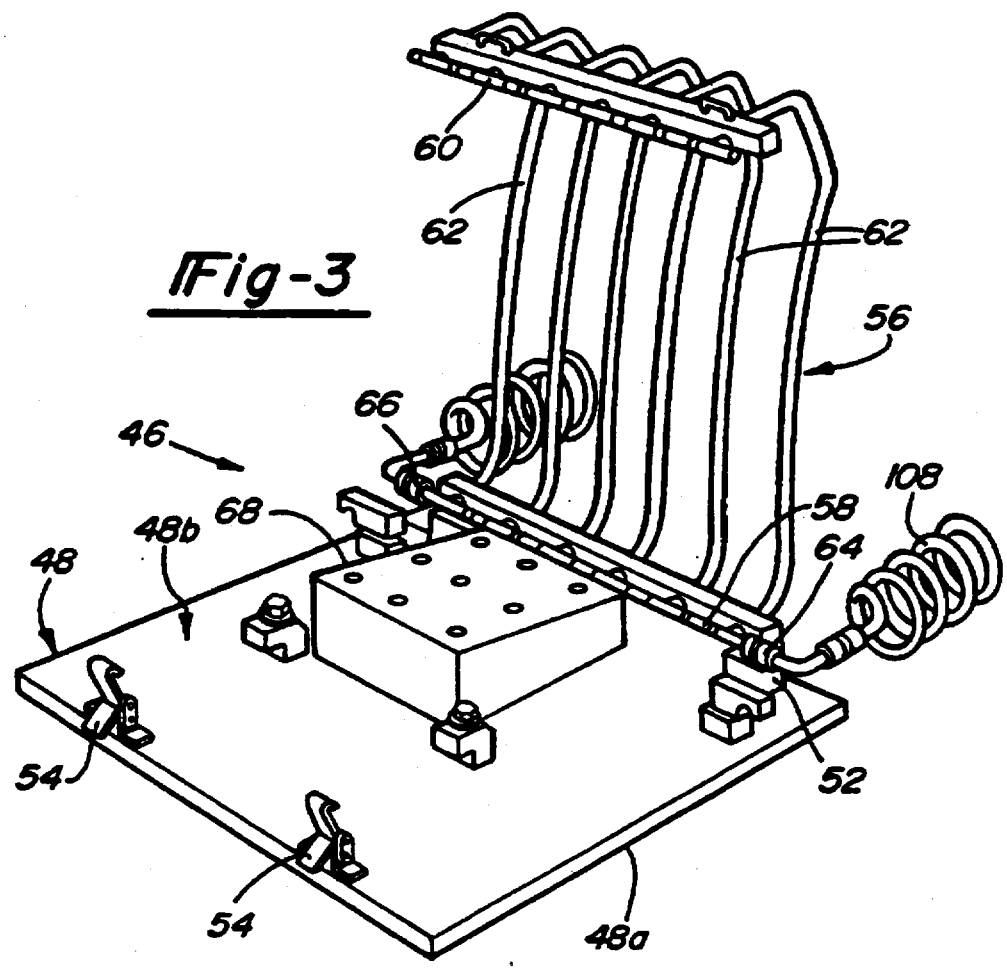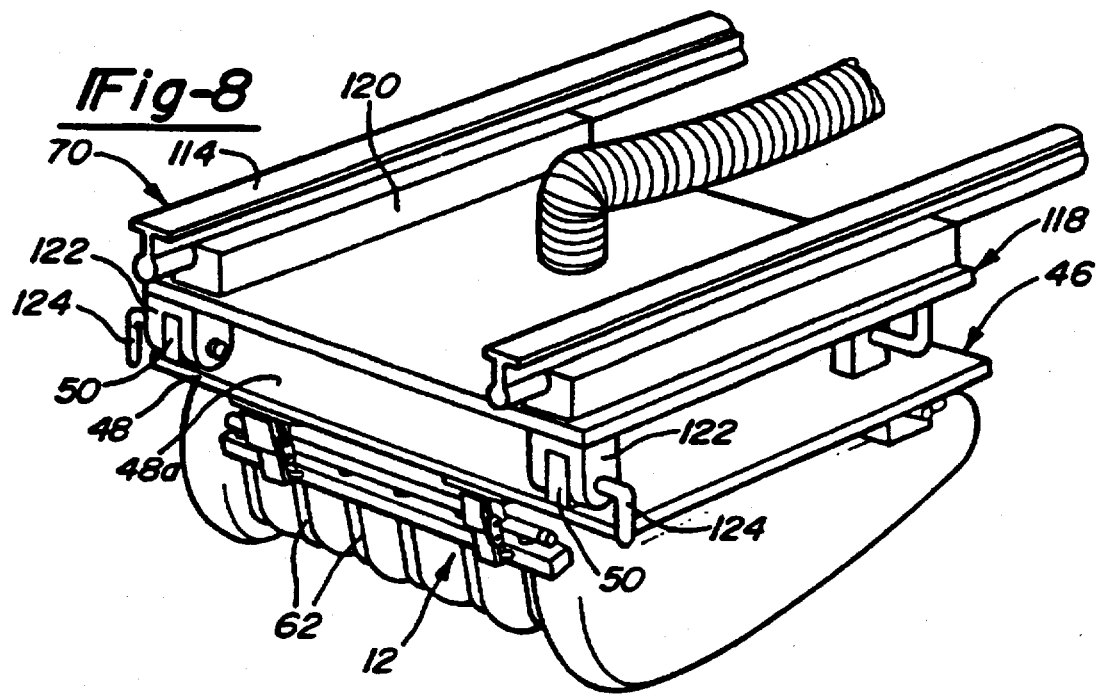

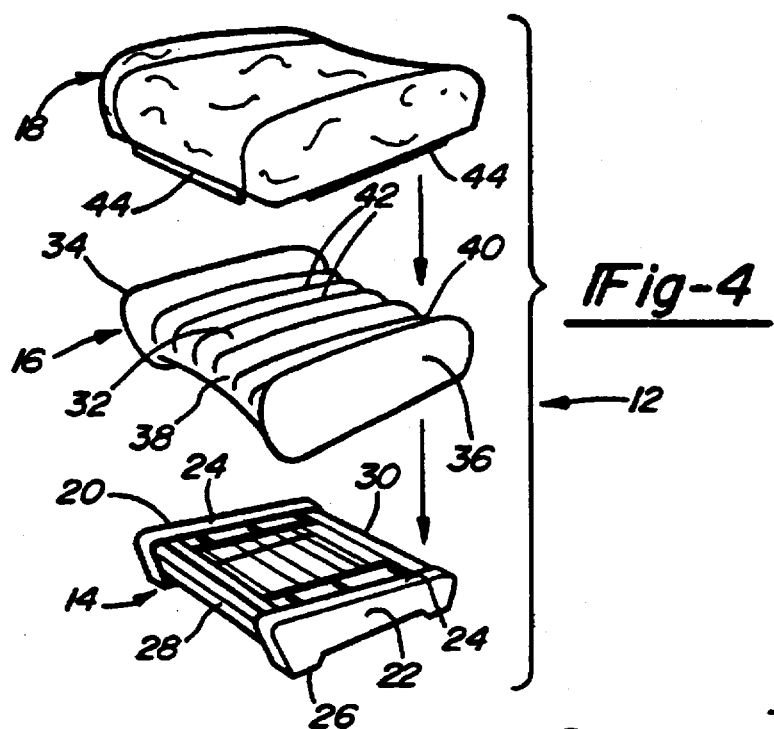
*Fig-4*
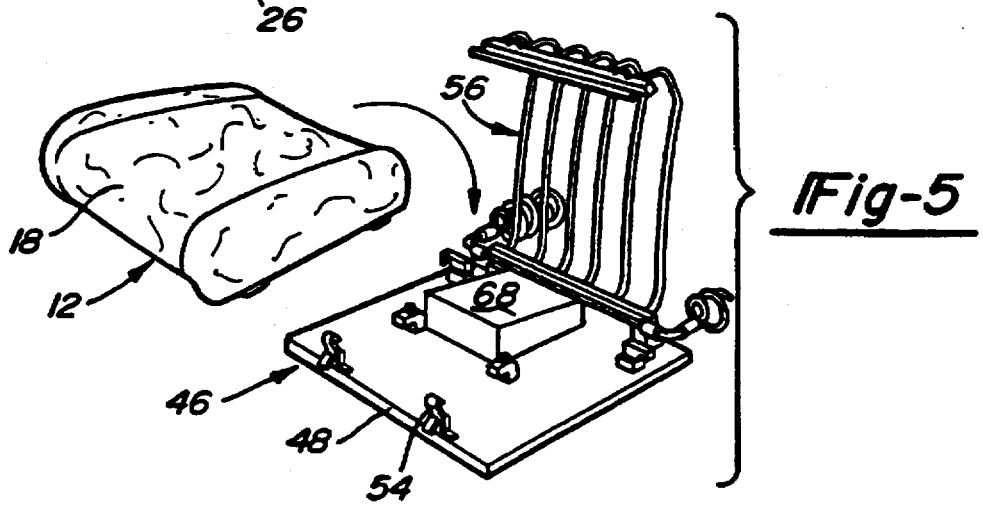
*Fig-5*
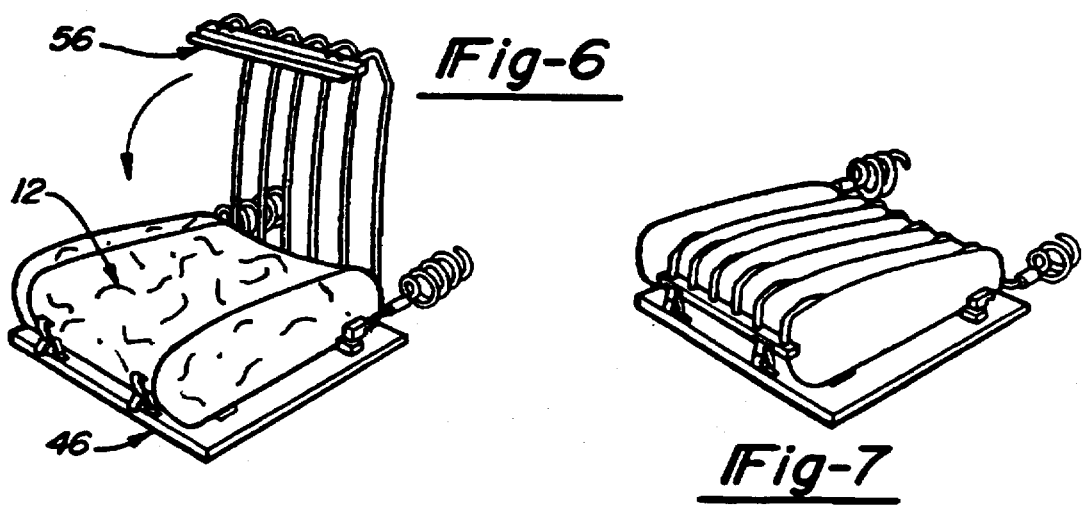
*Fig-6*
*Fig-7*

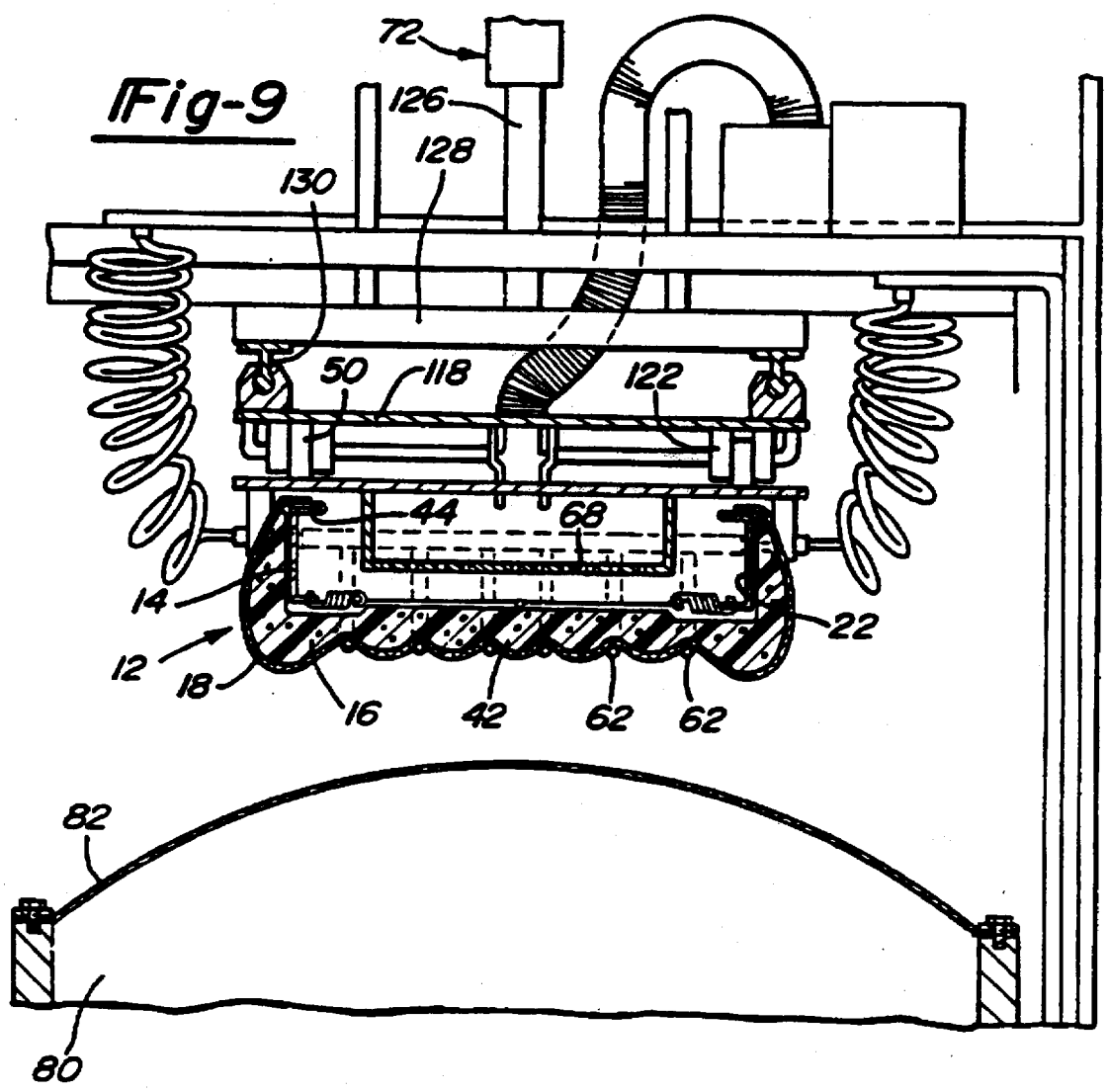
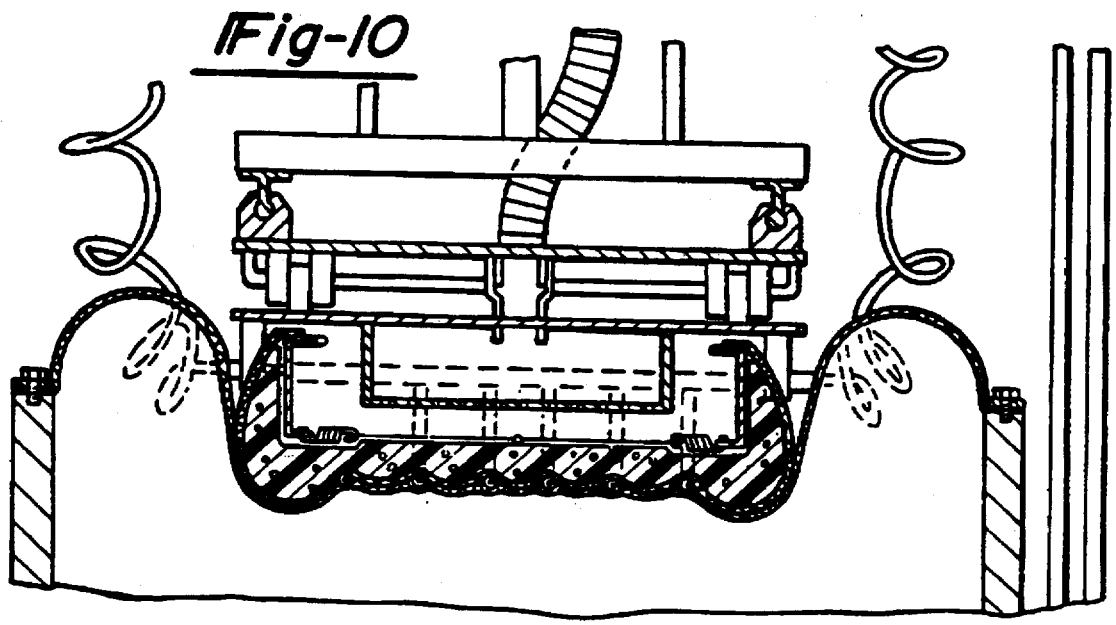

METHOD FOR BONDING A COVER TO A FLEXIBLE PAD

BACKGROUND OF THE INVENTION

1. Technical Field

This invention relates to a method and apparatus for covering an object with a sheet of flexible material and, more particularly, to an assist fixture in combination with a bed apparatus having a cushion of hot air used for bonding a cover material to a contoured substrate, such as a urethane pad, to form an attractive assembly retaining soft-surface touch as well as providing sharp definition of features.

2. Background Art

Numerous commercial products are formed by adhering a fabric cover or other such material to rigid and semi-rigid foam panels. Adhering the sheet material to a nonplanar substrate is quite difficult especially when it is required that the adhered fabric have the same profile or contour as the nonplanar substrate. One good example of such a product is a seat or an interior door panel incorporated into a vehicle such as an automobile.

Typically, these vehicle panels are required to include decorative features and simulate the pleats that would be associated with a traditional cut-and-sew assembly. It is generally desired that all the contour features be comfortable to the touch and appealing to the eye, for which reasons each contour feature is generally covered by a layer of fabric or other suitable sheet material, such as vinyl or leather, that may include bilaminate or trilaminate constructions. Methods of constructing such an assembly in an economical manner, which reduce costs or eliminate labor-intensive steps, are constantly being sought.

An exemplary fabrication is disclosed in U.S. Pat. No. 4,692,199 to Kozlowski wherein high temperature steam is forced through a porous mold to heat and diffuse an adhesive film into adherence with an adjacent fabric layer and foam pad to secure the two together. However, high temperature steam can be detrimental to the foam and require additional overbuild of the foam to compensate for height loss. Accordingly, this translates into a more costly product.

By using hot air instead of high temperature steam, such as in conjunction with a fluidized bed of particles which operate as a heat sink to store the energy from the hot air to be later transferred to activate the adhesive to bond the foam pad and cover together, there is no detrimental result to the foam. In the process for covering an object such as a seat disclosed in U.S. Pat. No. 5,176,777 to Gullhem, a fluidized bed of particles comprising a multitude of glass balls is covered with a porous pliable membrane, a flexible cover is placed above the membrane, pressure is applied to the object, the flexible cover is deformed as the object is immersed in the fluidized bed of particles until a mating imprint is formed on the object. The covering can be effected by gluing, in particular with a previously applied heat-activated adhesive, in which case the fluidized bed of particles is obtained by means of a current of hot air at a temperature above the activation temperature of the adhesive.

Application of a fluidized bed of particles is also described in U.S. Pat. No. 5,407,510 to Marfilius et al., which is assigned to the assignee of the present invention, namely Douglas & Lomason Company of Farmington Hills, Mich. This approach is attractive, particularly when compared to other bonding processes, because no costly custom-designed molds are required for the bonding setup. Further, as the complexity of the contour increases, so will the registration of the cover to the foam, the amount of sharp definition attainable without bridging of the cover sheet, and the possibility of wrinkles in the cover sheet.

Through refinement of the bonding process it has also been determined that apparatus can achieve effective bonding in the absence of the fluidized bed of particles, relying only upon a bed apparatus having a cushion of hot air operable to activate the adhesive.

Accordingly, it is an object of this invention to provide a novel method for constructing a vehicle seat or trim panel of foam and having a soft surface touch.

A further object of this invention is the elimination of labor-intensive steps in bonding fabric to a foam pad.

Another object of this invention is provision of an economical method of bonding a seat cover to a foam pad wherein the seat cover can be attached to a frame before the bonding process so that the seat is complete when removed from the press.

SUMMARY OF THE INVENTION

According to the present invention, a normally non-tacky, in-use dry adhesive is applied to the back of a cover sheet, the cover sheet is positioned on a resilient foam pad, an assist fixture is lowered against the cover and the cover pressed against the appearance surface of the foam pad to form an assembly. The assembly is plunged into a cushion of hot air created in a bed apparatus and pressed thereagainst for a period sufficient to activate the adhesive and bond the cover sheet to the pad. The assembly is thereafter cooled by exposure to ambient air. The bonding process can include precoating the cover sheet with the adhesive or interposing a separate sheet of dry adhesive between the back of the cover sheet and the appearance surface of the foam pad. The positioning step can include applying a vacuum through the foam pad, just prior to immersing the assembly into the cushion of hot air of the bed apparatus, to facilitate the drawing of heated air through the pad. In addition, it is preferred to continue the application of a vacuum through the cover sheet and foam pad both during the plunging of the assembly into the cushion of hot air and during the removal step to facilitate rapid activation and subsequent curing of the adhesive.

According to an important feature of this invention, the appearance surface of the foam pad is preformed to include indentations representative of seat features, and associated tubes of the assist fixture are in the form of the seat features to be simulated to enhance the surface definition and adherence of the cover sheet. Further, the tubes of the assist fixture are adapted, if necessary, to pass hot air or cold air, depending on such factors as the stage of the process, the specific adhesive, the ability of the sheet material to withstand a specific temperature, and the nature of the indentations or other style features on the appearance surface of the foam pad.

Advantageously, the apparatus and process in combination with the cushion of hot air eliminates the requirement for special matched metal or plastic bonding tools or molds.

Further, the assist fixture in combination with the cushion of hot air of the bed apparatus and foam pad enables the part to be finished in situ and in one step. The fabric cover is attached to the pad before the bonding process so that the finished product, such as a finished seat assembly, is complete when removed from the fixture. By such process, costly molds are eliminated. Importantly, the fabric is subjected to only one heating, thereby minimizing the likelihood that a polymeric fiber will degrade under repeated exposure to the heat level needed for a given process.

Additional advantages include the provision of a foam seat having a bonded cover which is breathable; a process that is reversible in that both the cover and the foam pad can be reclaimed; and a process that permits the cover to be preformed to thereby assure proper cover registration for complex shapes or highly defined parts.

Further objects, advantages, and features of the present invention will become more fully apparent from the detailed consideration of the arrangement and construction of the constituent parts as set forth in the following description taken together with the accompanying drawings.

BRIEF DESCRIPTION OF THE DRAWINGS

FIG. 3 is a perspective view of an assist fixture according to this invention;

FIG. 4 is an exploded perspective view showing a preformed cover, a foam pad, and a seat frame positioned for assembly into a preassembly;

FIGS. 5–7 are perspective views showing the preassembly being fixedly mounted to the assist fixture;

FIG. 8 shows a portion of a shuttle rail system which extends across the bed apparatus and cushion of hot air and the assist fixture with the preassembly mounted for movement relative to the shuttle rail;

FIGS. 9–10 are fragmentary end views of the apparatus, in elevation, showing the assist fixture with the preassembly, respectively, positioned above and pressed against the cushion of hot air of the bed apparatus;

DETAILED DESCRIPTION OF THE PREFERRED EMBODIMENT

Figure 1:
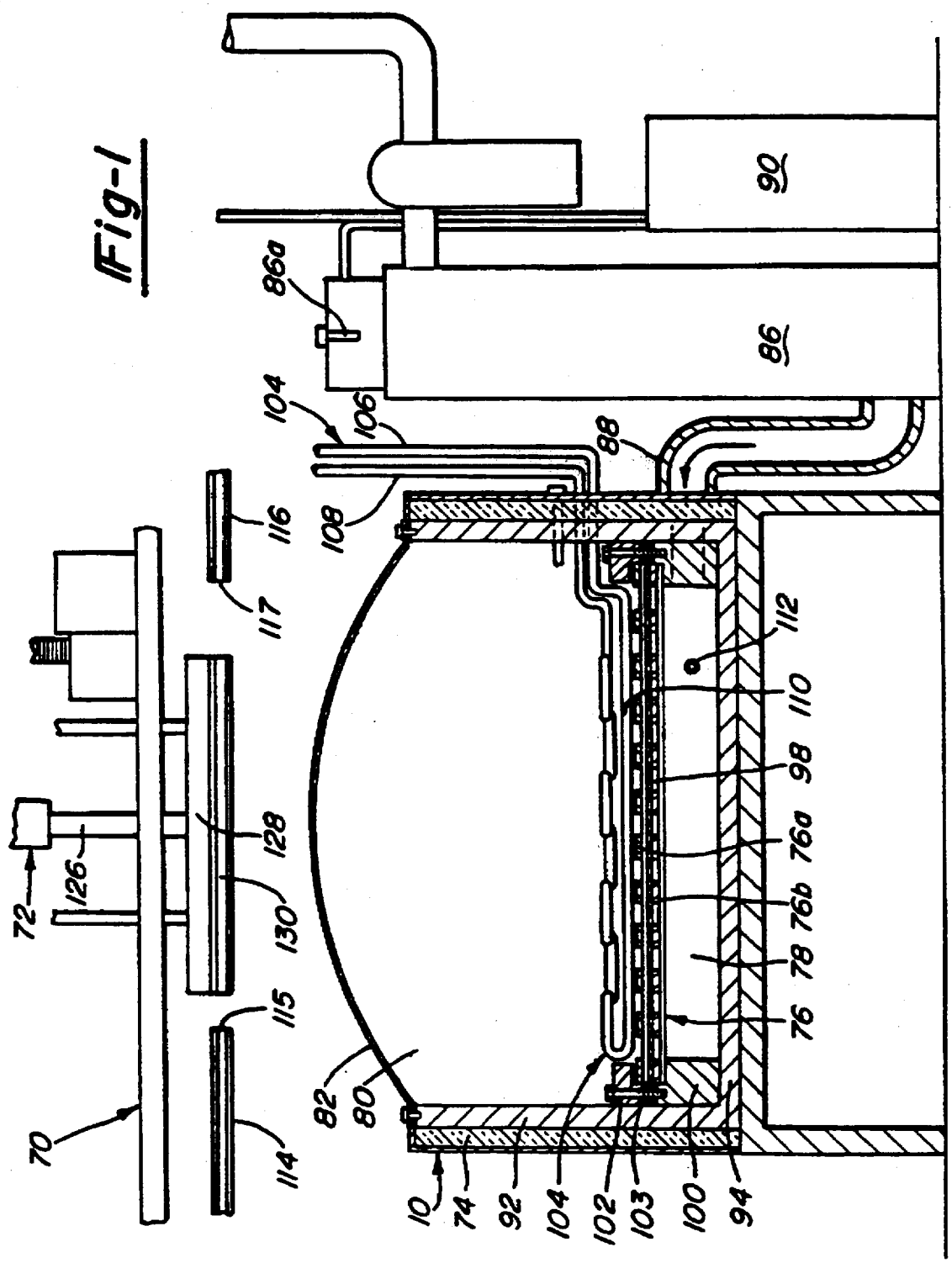
FIG. 1 is an end view in elevation, partially in cross-section, of the bed apparatus including a cushion of hot air for practicing this invention.
Figure 2:
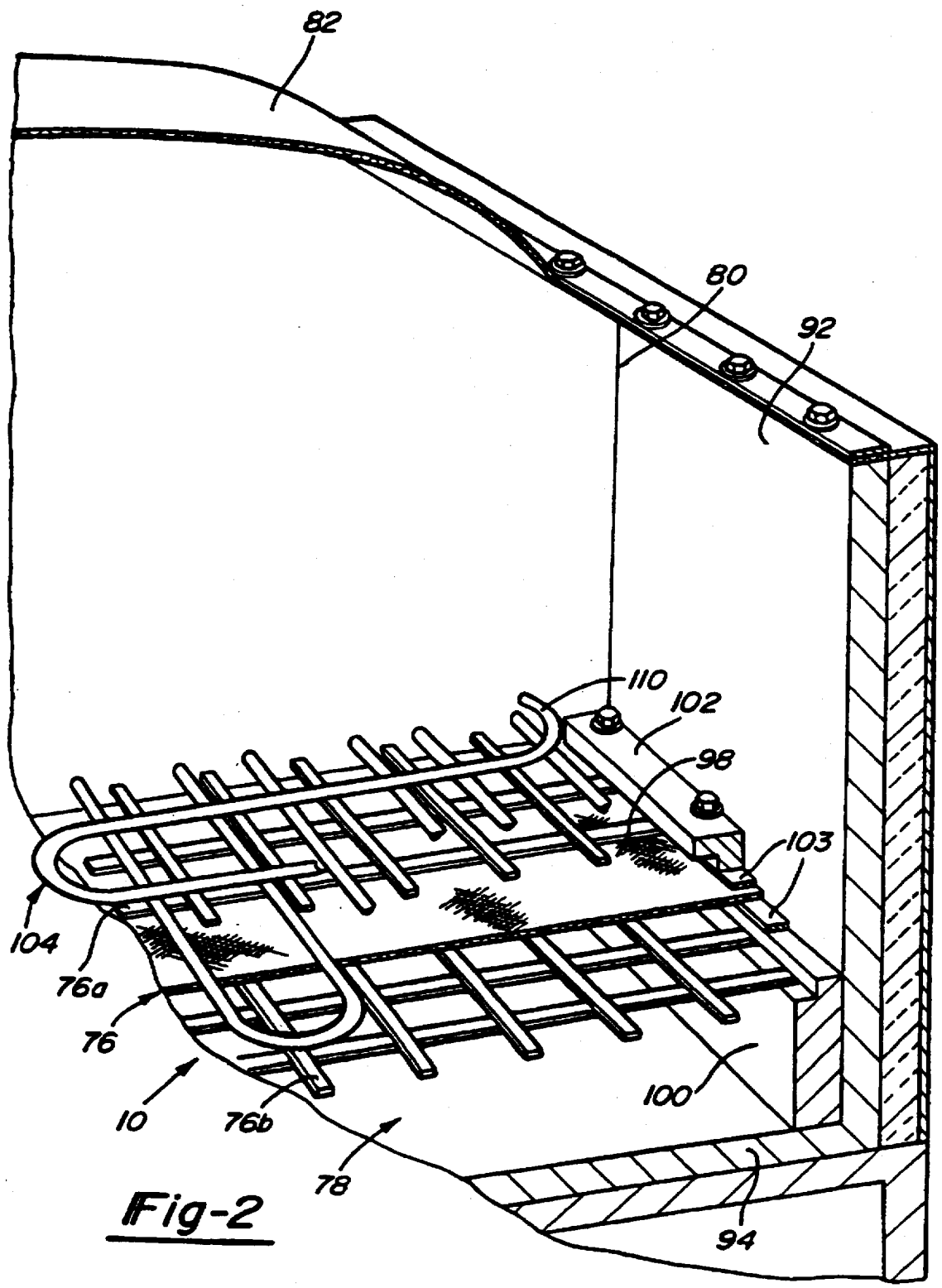
FIG. 2 is a perspective view looking downwardly at a fragmentary cut-away of the apparatus shown in FIG. 1.
Figure 11:
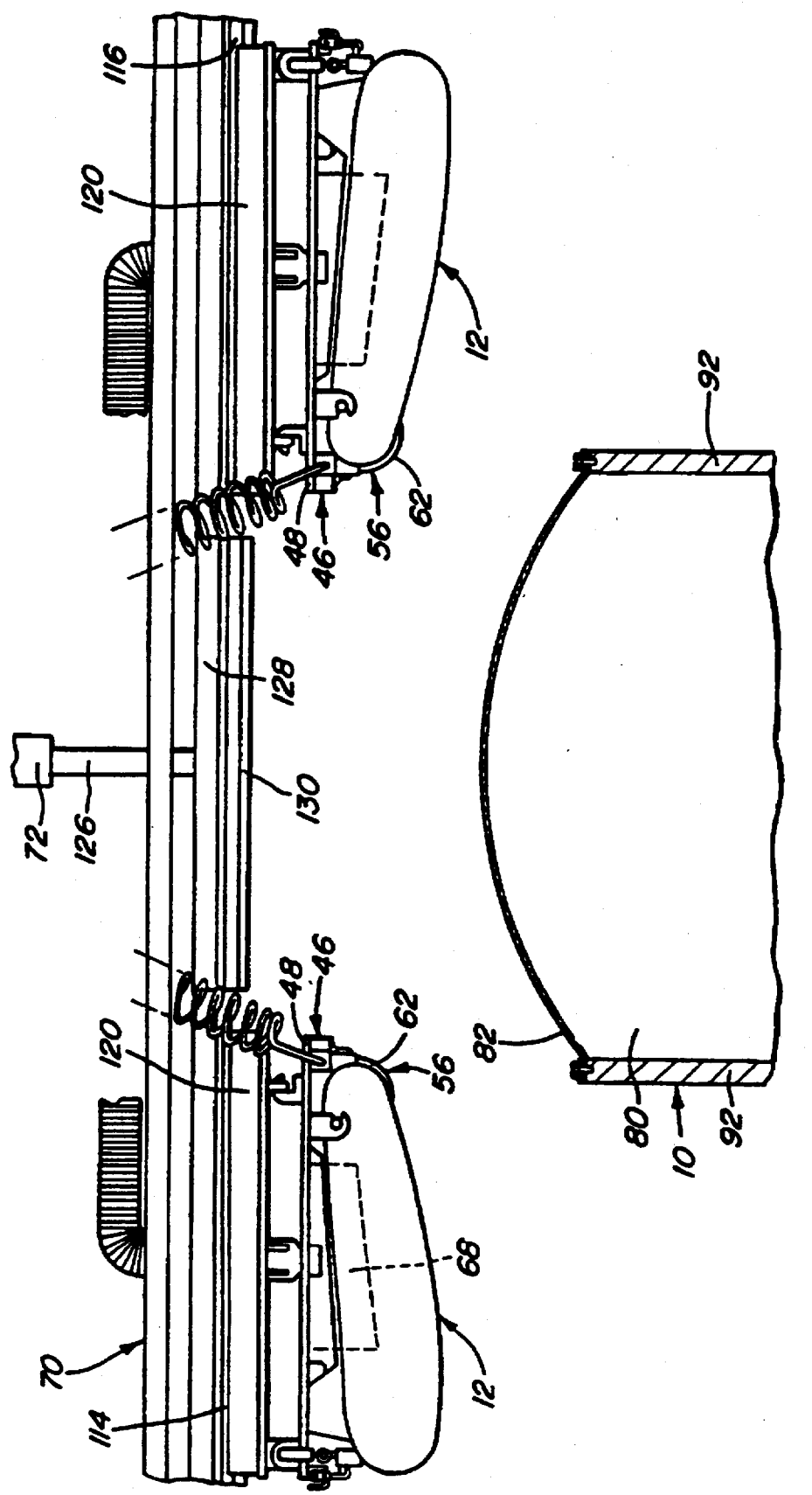
FIGS. 11–12 are fragmentary side views of the apparatus, in elevation, showing the assist fixture with the preassembly, respectively, positioned above and pressed against the cushion of hot air.
Figure 12:
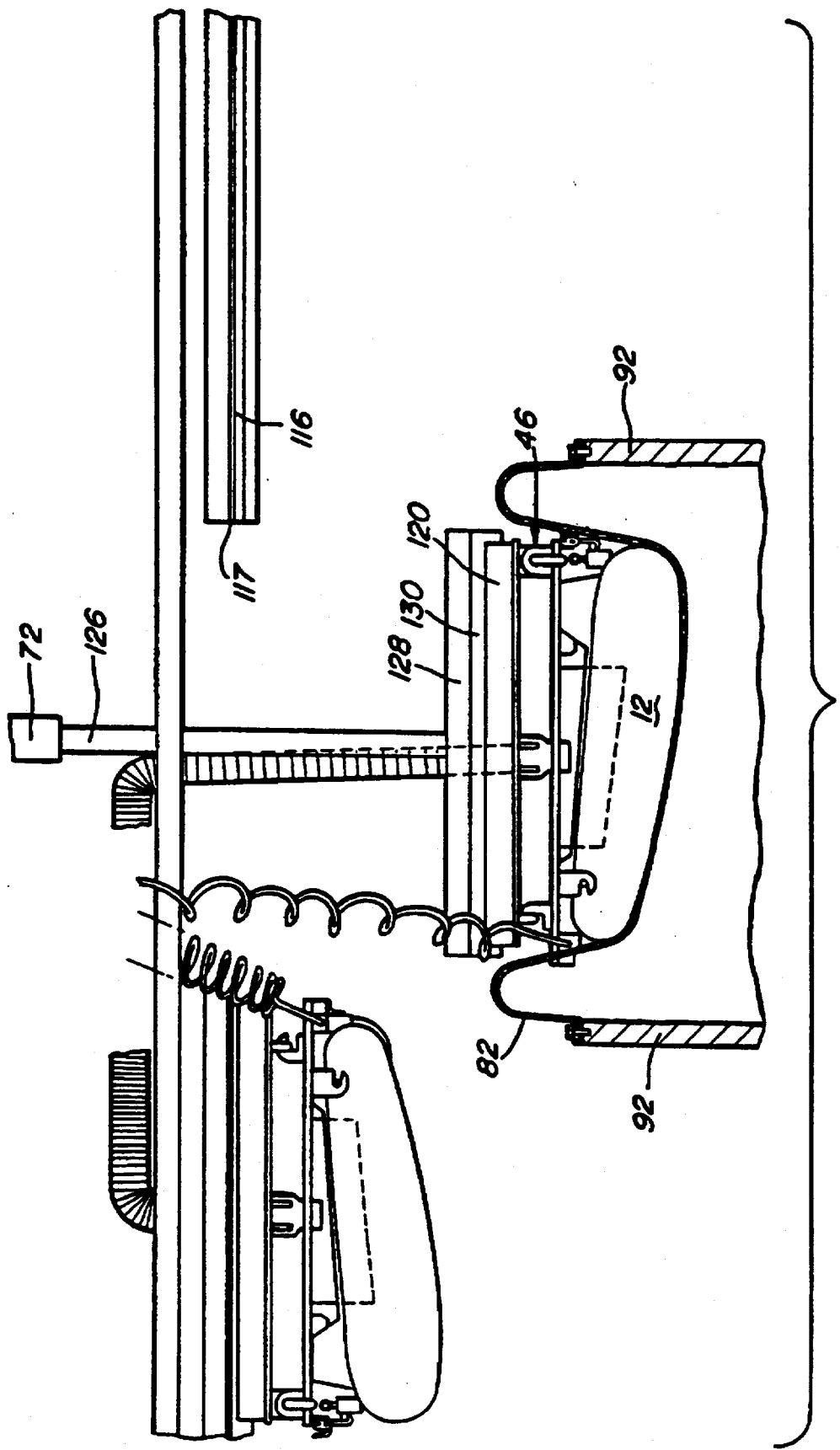

Turning now to the drawings, FIGS. 1–12 illustrate a method and bed apparatus 10 including a cushion of hot air 80 defined by a membrane cloth 82 for bonding a cover material to a resilient foam pad. In brief, the invention contemplates preforming the resilient foam pad, possibly so as to include indentations on its appearance face that are representative of surface features, and applying heat and pressure to activate a dry heat-activatable adhesive to bond the cover sheet to the foam pad. Although the foam pad described herein is intended for use in an automotive vehicle, such as in a vehicle seat assembly, it is to be understood that such description is exemplary and could be employed in other applications requiring bonding of sheet material to a resilient support base and simulation of the appearance features of a cover installed using the traditional cut-and-sew approach.

As shown best by reference to FIG. 4, a seat assembly 12 includes a conventional seat pan 14, a resilient foam pad 16, and a seat cover 18 of a fabric material to be bonded to the foam pad. The seat pan includes a pair of side frames 20 and 22 each including an upper and lower frame portion 24 and 26, and forward and rearward frame portions 28 and 30 extending between the side frames.

The foam pad 16 is preformed of a resilient material and includes a contoured top appearance surface 32, a pair of sidewalls 34 and 36, and front and back portions 38 and 40. The foam pad is configured to seat about the seat pan 14 so that the side walls confront the side frames and the front and back portions confront the forward and rearward frame portions. Alternatively, the seat pad 16 may be formed integrally with the pan 14 by placing the pan directly into the pad mold during the molding process. The resilient pad material is known to those skilled in the art and generally comprises a material that is capable of being exposed to elevated temperatures without undergoing material degradation or losing resiliency. Suitable materials include urethane foam polyester fiber, fiber board, and thermoplastic. These materials are exemplary and for the purpose of illustration, and it is not intended either to be limiting or to exclude other compositions.

According to an important feature of this invention, the contoured appearance surface 32 of the foam pad 16 frequently includes various stylized recesses and indentations, such as would be seen in a finished product wherein the seat cover has been stitched to a cushion. As shown, the appearance surface includes a plurality of elongated linear indentations or grooves 42, the grooves being laterally spaced in generally parallel relation to one another and extending between the front and back portions 38 and 40 of the pad. The indentations could also be criss-crossed to simulate a tufted surface as is found in upholstered seats.

The seat cover 18 is generally formed into the exterior shape of the foam pad 16 and includes an outer appearance surface, an inner surface adapted to face the pad, and marginal edges. For attachment to the seat pan and the foam pad, a plurality of J-hooks 44, hog rings, or other such fastening means, are provided along the marginal edges of the seat cover with the hooks being adapted to be connected to the underside of the seat pan.

The process of bonding a fabric cover to a foam member is a function of the particular fabric and its ability to withstand elevated temperature without degradation, the particular adhesive used, and the process steps. Good bond strength can be achieved with both dry and wet adhesives.

The process of the present invention contemplates the use of many different materials, such as polymeric fiber cloths, crushed velvet, and velour. As will be described, leather and vinyl are also within the contemplation of the invention.

In the preferred embodiment, a separate sheet of such dry/web heat-activatable adhesive may be interposed between the cover and the central portion of the pad. Only the central portion of the back of the seat cover 18 is exposed to the adhesive so that only the central portion of the seat cover will be bonded to the pad. The J-hooks 44 will then allow the sides of the seat cover extending around the periphery of the foam pad to flex independently of the pad, thereby to inhibit the onset of creases. Alternatively, the back of the seat cover 18 can be selectively precoated to include a normally non-tacky, in-use layer of a powdered heat-activatable adhesive. Further, the adhesive may alternatively or additionally be applied to the central portion of the appearance surface 32 of the foam pad 16.

While many adhesives are available, thermoplastic adhesives have been found desirable, one example being a powdered polyamide adhesive. When such thermoplastic adhesives are used, if the bonding is done improperly, the bonding process is reversible through the re-application of heat so that the seat cover can be removed from the pad, and the cover and pad each reused.

Vinyl and leather are very sensitive to high temperatures, and are believed to require a spray adhesive. Unfortunately, such adhesives, when cured, do not permit the seat cover 18 to be removed from the pad (i.e., the bonding is not reversible).

According to this invention, there is provided a mounting fixture 46 to hold the seat cover 18 in aligned relation to the contour of the pad 14 and to provide the desired surface definition in the seat cover 18. In particular, the mounting fixture 46 includes an assist tool 56 that ensures an intimate contact between the seat cover and the pad within the indentations in the show surface of the pad to ensure that the seat cover is properly bonded to the pad in these areas. In the preferred embodiment the assist tool 56 is additionally employed to facilitate the activation as well as the subsequent curing of the adhesive. The assist tool 56 also serves to properly register the cover to the pad and inhibit the seat cover 18 from shifting relative to the contour of the foam pad 16 during the bonding process.

With particular reference to FIG. 3, the mounting fixture 46 comprises a flat support base 48 having upper and lower surfaces 48a and 48b, mounting lugs 50 (FIG. 8) projecting upwardly from the upper surface 48a, and an apertured air manifold 68 extending from the lower surface 48b of the fixture 46. The assist tool 56 is pivotably mounted to the fixture 46 via a pair of hinge members 52, and comprises a tubular frame having a pair of longitudinal ends 58 and 60, the end 58 being pivotally mounted to the hinge members 52 and the end 60 being free to pivot into and from secured engagement with a pair of latch members 54 located on fixture 46.

The assist tool 56 in the preferred embodiment is comprised of a plurality of small diameter air tubes 62 integrally joined and interconnected to pass air between an inlet and outlet end 64 and 66 thereof, these ends being connectable to a source of pressurized air. The assist tool 56 is adapted to be pivoted onto the top of the seat cover 18 so that the air tubes 62 register with and seat sit within the corresponding indentations 42 in the pad. As will be described, heated air can be passed through the assist tool 56 via the inlet end 64 during one stage of the bonding operation, and cooling air can be passed through the assist tool 56 via the outlet end 66, if desired, during another stage of the bonding operation.

The apertured air manifold 68 comprises a rectangular land that projects upwardly from the lower surface 48b of the mounting fixture 46 for positioning within an internal cavity formed by the walls of the seat pan. Alternatively, in applications where the pad has been molded directly to the pan, the pad may be provided with an internal cavity on its underside for receiving the air manifold. The manifold 68 is connected to a source of vacuum and serves several important functions. Firstly, the manifold serves to draw hot air through the seat cover and foam pad during the heating process when the assembly is plunged into the cushion of hot air of the bed apparatus to facilitate complete and rapid activation of the adhesive. Secondly, the manifold 68 draws ambient air through the seat cover and foam pad to cool the assembly and facilitate rapid curing of the adhesive after the assembly is withdrawn from the bed apparatus.

With particular reference to FIGS. 1, 2, 11, and 12, an apparatus for carrying out the invention includes the bed apparatus 10, one or more mounting fixtures 46, a shuttle rail system 70 for transporting the mounting fixtures above the bed apparatus 10, and a ram 72 for receiving and driving a loaded mounting fixture into the bed apparatus 10 and the cushion of hot air 80. The mounting fixture 46 is preloaded with the elements of a seat assembly 12, is moved into engagement with the ram, and driven vertically downwardly by the ram and into pressed relation against the membrane cloth 82 and into the cushion of hot air 80.

The bed apparatus 10 includes an oblong container in the form of a generally rectangular box or empty chamber 74 having a grate system 76, a chamber or plenum 78 formed below the grate system at the bottom of the box, and a thin filter or membrane cloth 82 secured along its peripheral edges to the upward extension of the box. Further, the box is connected to an ambient air source 84 capable of supplying a relatively high volume of ambient air at relatively low pressure to the bed apparatus 10, a heater 86 for heating the air, an air manifold 88 for introducing the heated low pressure air into the chamber 78, and a control system 90 for controlling the sequence of operation.

The box 74 comprises a plurality of vertically directed, thermally insulated walls 92 and a base 94, the walls having their lower ends adjoined to the base and their upper ends forming a rectangular opening for securing the membrane cloth. The membrane cloth 82 is permeable, compliant to conform to the shape of the pad when the pad is plunged into the cushion of hot air 80 of the bed apparatus 10, and sufficiently heat resistant to withstand the temperature of the hot air.

The grate system 76 includes upper and lower lattices 76a and 76b and a woven stainless steel wire mesh screen 98 sandwiched between the lattices. The mesh screen 98 must be sufficiently and homogeneously porous to pass air vertically from the chamber to generate a uniform distribution of air within the bed apparatus 10 and create the cushion of hot air 80.

A plurality of stepped support blocks 100 and associated retainer blocks 102 are located on the base and against the inner surface of the walls to vertically support the grate system 76 horizontally above the base. The retainer blocks 102 are generally L-shaped in cross-section to form an annular inwardly opening recess above the support block 100 sized to receive the peripheral edges of the grate system. The retainer blocks 102 are threadably engaged to the respective support blocks 100 and each operates to compress a pair of gaskets 103 against the peripheral edges of the mesh screen 98 and against the support block 100 to form an air-tight seal around the edges of the bed apparatus 10 and inhibit draughts which might otherwise effect the distribution of the hot air in the cushion of hot air 80.

In a preferred application, the mesh screen 98 has a mesh size of about 10 microns, and the membrane cloth 82 is comprised of monofilament polyester or nylon having an air permeability of about 30–40 CFM, each being known and commercially available.

A tube 104 having opposite inlet and outlet ends 106 and 108 has a serpentine central portion 110 disposed above the grate system 76 and in the bed apparatus 10, the tube defining a continuous air path between an external source (not shown) of compressed ambient air at low volume and high pressure and the assist tool 56. The tube 104 has its inlet end 106 connected to the external source and its outlet end 108 connected to the inlet end 64 of the assist tool 56. The high pressure air passed through the tube is heated by the exposure of the tube to the hot air to provide heated air to the associated air tubes 62 of the assist tool 56, such as during the period that the assist tool is pressed into cushion of hot air 80 to activate the adhesive.

According to another feature of this invention, the outlet end 66 of the assist tool 56 is connectable to a cool air source (not shown). A suitable period after the fixture assembly is removed from the cushion of hot air 80, a valve (not shown) can be used to switch the air circulating through the assist tool from the heated air via the inlet to cooling air via the outlet to facilitate cooling of the seat assembly.

The heater 86 is adapted to heat the air from the source 84 to a desired temperature sufficient to activate the adhesive. To assure that the process temperature has been achieved, a thermocouple 86a controls the temperature of the air supplied and a thermocouple 112 is disposed in the chamber 78 to sense the temperature of the air supplied to the bed apparatus 10 to create the cushion of hot air 80.

In operation, the air is supplied to the chamber at about 600° F., with the air coming through the bladder approximately between 320–330° F., with 325° F. being preferable for most applications. In addition, the air is supplied at about 12 to 16 psi, with 14 psi being generally preferred.

The temperature and pressure of the air supplied, however, is not limited to these ranges. It is conceivable to use air at a higher or lower temperature corresponding to the temperature necessary to activate a particular adhesive.

The shuttle rail system 70 includes a pair of first rail assemblies 114 and 116 having their terminal ends 115 and 117 laterally spaced from one another, and a shuttle 118 including a second rail assembly 120 which is engageable with and movable along the rails 114 or 116. The shuttle 118 includes mounting lugs 122 which are engageable with the lugs 50 on a mounting fixture 46, the lugs being removably mounted together by pins 124.

The ram 72 includes a vertically reciprocable piston 126, and a press 128 at the end of the piston. The press 128 includes a rail assembly 130 that is adapted to interengage with the second rail assembly 120 on the shuttle 118 to receive the loaded fixture, the press being adapted to drive the loaded fixture assembly against the membrane cloth 82 and into the cushion of hot air 80.

The rail assemblies 114, 116, and 130 cooperate to form a continuous rail system to engage the rail assembly 120 on the mounting fixture 46 to move successive mounting fixtures into registration with the ram. In the embodiment shown, each rail assembly includes a pair of rails in side-by-side relation.

The control system 90 is provided to regulate the temperature of the cushion of hot air 80 and the flow of fluid through the assist fixture in accordance with operation sequences.

In operation, the bonding system according to the present invention functions in the following manner:

1. The bed apparatus 10 is activated to create the cushion of hot air 80 by injecting heated air into the bed apparatus 10 and the temperature of the cushion of hot air 80 is brought up to its appropriate operating temperature.
2. The foam pad 16 and pan 14 subassembly are positioned on the mounting fixture 46 and the seat cover 18 with the adhesive applied to its backside is placed over the pad 16 and connected to the pan 14 with the J-hooks 44.
3. The assist tool 56 is then pivoted into registration with the indentations in the appearance show surface of the pad to provide the desired surface definition in the seat cover, and latched to the mounting fixture 46 via latches 54.
4. The mounting fixture with the seat subassembly 12 is then loaded onto the first rail assembly 114 where it is thereafter shuttled onto rail assembly 130 to orient the mounting fixture with the ram press 72.
5. The ram is then activated to lower the loaded mounting fixture assembly into the cushion of hot air 80 of the bed apparatus 10. The seat subassembly 12 is thus pressed down into the cushion of hot air 80 against the cloth 82 so that it yields to the contour of the seat, as shown in FIG. 10.
6. The ram is held in the down position pressing the seat-covered pad against the contour-conforming cushion of hot air 80 for a time period sufficient to activate the adhesive and bond the seat cover to the pad. In the preferred embodiment, this step is performed in approximately 30 to 60 seconds. Note that during this stage the vacuum source is drawing heated air through the seat cover and pad, into the air manifold 68 on the mounting fixture, thereby enhancing the activation of the adhesive. Additionally, during this stage of the process it may further be desirable to activate the control system 90 to circulate heated air through the assist tool 56 to ensure proper activation of the adhesive within the indentations in the appearance surface of the pad.
7. Thereafter, the ram is raised, extracting the loaded mounting fixture assembly from the bed apparatus 10 and the cushion of hot air 80, and the assembly is shuttled out of registration with the ram 72 and back onto the first rail assembly 114. The vacuum source now begins to draw cooling ambient air through the seat subassembly into the air chamber 68, thereby facilitating the rapid cooling of the seat subassembly and the consequent curing of the adhesive. Subsequently, the control system 90 will terminate the flow of heated air through the assist tool 56 and initiate the flow of cooling air through the assist tool to effectively cool and cure the adhesive within the indentations.
8. Lastly, the loaded mounting fixture assembly is removed from the rail assembly 114, the assist tool 56 is unlatched, and the completed seat subassembly is removed from the mounting fixture 46.

Significantly, it will be appreciated that when the assist tool 56 is used in this manner as a conduit for heated and cooling air, the overall cycle time of the bonding process can be minimized as it no longer becomes necessary to, firstly, extend the immersion period into the bed apparatus 10 to ensure that the heat from the cushion of hot air 80 has adequately permeated all of the various indentations in the pad, and secondly, extend the cooling period while the seat subassembly remains on the mounting fixture to ensure complete curing of the adhesive. Consequently, with the overall cycle time of the bonding process reduced, the production capacity of the equipment is increased and the cost of production reduced.

Preferably simultaneously with the first mounting fixture assembly being operated on, a second operator loads, or unloads, a second seat subassembly onto a second mounting fixture on the second rail assembly 116. When the first loaded mounting fixture assembly has been retracted from the cushion of hot air 80 of the bed apparatus 10 and moved back to the first rail assembly, the second loaded mounting fixture subassembly is moved to the ram and immersed into the cushion of hot air 80, during which time the first operator unloads the first completed seat subassembly and loads a third seat subassembly onto the first mounting fixture.

While the above description constitutes the preferred embodiment of the invention, it will be appreciated that the invention is susceptible to modification, variation, and change without departing from the proper scope or fair meaning of the accompanying claims.

What is claimed is:

1. A process for adhesively bonding a flexible cover sheet having a front surface and a back surface to a flexible pad having a contoured appearance surface, said process comprising the steps of:

positioning said back surface of said cover sheet adjacent said appearance surface with a heat-activatable adhesive disposed therebetween such that said cover sheet, said adhesive, and said flexible pad form an assembly, mounting said assembly to a support frame, providing a bed apparatus having a chamber devoid of particulate matter defined by interior surfaces of the bed apparatus and constructed and arranged to be filled with hot air, a permeable membrane constructed and arranged to allow a quantity of hot air to permeate therethrough and secured at one end of said chamber, and a hot air inlet, said bed apparatus being constructed and arranged such that hot air continuously flows through said hot air inlet and fills said chamber thereby distending said permeable membrane to define a hot air cushion, pressing said assembly into said hot air cushion such that said hot air cushion substantially conforms to the contoured appearance surface and applies heat and pressure to the front surface of said cover sheet thereby activating said adhesive and bonding the back surface of said cover sheet to the appearance surface of said flexible pad, allowing said adhesive to cure, and removing said assembly from said support frame.

2. The process as claimed in claim 1, wherein said flexible pad is comprised of a porous material, further including the step of applying a vacuum to a side of said flexible pad opposite said appearance surface and drawing hot air from said hot air cushion through said pad while said assembly is pressed into said hot air cushion to enhance activation of said adhesive.

3. The process as claimed in claim 2, further including the step of maintaining said vacuum and drawing ambient air through said pad for a time sufficient to enhance cooling of said assembly.

4. The process as claimed in claim 1, wherein said flexible pad has said contoured appearance surface, a back side and peripheral sides, and further including the step of securing marginal edge portions of said cover sheet to the back side of said pad to form said assembly.

5. The process as claimed in claim 1, further including the steps of providing above said bed apparatus a ram and a first rail and a second rail, each said rail having a terminal end adjacent to the ram and opposite terminal ends spaced from one another, mounting a first and a second support fixture, respectively, on said first and second rails, loading a first assembly onto said first support fixture while pressing a second assembly previously loaded onto said second support fixture and transferred from said second rail to said ram, into said bed apparatus, removing said second assembly from said bed apparatus and transferring said second support fixture from said ram to said second rail, transferring said first support fixture from said first rail to said ram and pressing said first assembly into said cushion of hot air in said bed apparatus while said second assembly is unloaded from said second support fixture and a third assembly is loaded onto said second support fixture, removing said first assembly from said bed apparatus and transferring said first support fixture from said ram to said first rail, and transferring said second support fixture from said second rail to said ram and pressing said third assembly into said bed apparatus while said first assembly is unloaded from said first support fixture and a fourth assembly is loaded onto said first support fixture.

6. The process according to claim 1 further including the steps of:

providing a ram constructed and arranged to press said assembly into said hot air cushion, providing a first rail with one end disposed adjacent said ram, said first rail constructed and arranged to allow said support frame to be mounted thereon, thereby allowing said assembly to be mounted on said first rail, providing a second rail with one end disposed adjacent said ram, said second rail constructed and arranged to allow said support frame to be mounted thereon, thereby allowing said assembly to be mounted on said second rail, and providing a ram rail on said ram, said ram rail constructed and arranged to allow said assembly to be transferred from said first or second rail to said ram rail without being removed from said rails, thereby allowing (1) a first assembly to be transferred from said first rail to said ram rail, pressed into said hot air cushion, withdrawn from said hot air cushion, and transferred from said ram rail to said first rail while a second assembly is being mounted on said second rail and (2) said first assembly to be removed from said first rail and a third assembly to be mounted on said first rail while said second assembly is transferred from said second rail to said ram rail, pressed into said hot air cushion, withdrawn from said hot air cushion, and transferred from said ram rail to said second rail.

7. The process according to claim 1 wherein said contoured appearance surface on said flexible pad has at least one appearance depression further including the steps of:

after mounting said assembly to said support frame, positioning an assist fixture having a tubular member relative to said assembly so that said tubular member is aligned with said appearance depression, forcing said tubular member against said cover sheet to cause a portion of said cover sheet to substantially conform to said appearance depression, and clamping said assist fixture in place before pressing said assembly into said hot air cushion.

8. The process according to claim 7, wherein heated air is passed through said tubular member while said assembly is pressed into said hot air cushion and ambient cooling air is passed through said tubular member while allowing said adhesive to cure while being retained by said assist fixture.

* * * * *